US007233352B2

(12) United States Patent
Matherson et al.

(10) Patent No.: US 7,233,352 B2
(45) Date of Patent: Jun. 19, 2007

(54) METHOD AND APPARATUS FOR COLOR NON-UNIFORMITY CORRECTION IN A DIGITAL CAMERA

(75) Inventors: Kevin J Matherson, Fort Collins, CO (US); Robert E Sobol, Fort Collins, CO (US); Christopher A Whitman, Fort Collins, CO (US); David Kay Campbell, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 728 days.

(21) Appl. No.: 10/174,945

(22) Filed: Jun. 20, 2002

(65) Prior Publication Data

US 2003/0234872 A1    Dec. 25, 2003

(51) Int. Cl.
*H04N 9/64* (2006.01)
*H04N 17/00* (2006.01)
*H04N 17/02* (2006.01)
*H04N 5/76* (2006.01)

(52) U.S. Cl. .................... 348/251; 348/187; 348/231.6

(58) Field of Classification Search ................ 348/272, 348/274, 280, 263, 251, 362, 231.6, 187, 348/347, 222.1; 358/518, 523; 382/167
See application file for complete search history.

(56) References Cited

U.S. PATENT DOCUMENTS

| | | | | |
|---|---|---|---|---|
| 4,520,395 A * | 5/1985 | Abe ........................... 348/251 |
| 5,343,302 A * | 8/1994 | Yamashita .................. 348/251 |
| 5,381,174 A * | 1/1995 | de Groot et al. ........ 348/207.99 |
| 5,424,781 A * | 6/1995 | Vlahos ....................... 348/587 |
| 5,576,797 A | 11/1996 | Kusaka et al. |
| 5,784,100 A * | 7/1998 | Konishi ...................... 348/251 |
| 6,055,066 A * | 4/2000 | Kanda ........................ 358/461 |
| 6,091,445 A * | 7/2000 | Matsui et al. ................ 348/96 |
| 6,707,500 B1 * | 3/2004 | Tamura et al. ............. 348/362 |
| 6,833,862 B1 * | 12/2004 | Li .......................... 348/207.99 |
| 7,075,569 B2 * | 7/2006 | Niikawa .................. 348/218.1 |
| 2005/0030383 A1 * | 2/2005 | Li ............................ 348/207.1 |

FOREIGN PATENT DOCUMENTS

WO    WO 01/01675    1/2004

OTHER PUBLICATIONS

Netherlands Search Report dated Oct. 5, 2005.

* cited by examiner

*Primary Examiner*—Ngoc-Yen Vu
*Assistant Examiner*—Gregory Madden

(57) ABSTRACT

Reducing or eliminated color-dependent vignetting in a digital camera includes: providing, for each color that said camera can image, a raw array of data corresponding to a desired scene; and changing the raw arrays such that the array for each color exhibits substantially the same amount of vignetting so as to reduce color-dependent vignetting in a composite image based upon each of the changed arrays.

30 Claims, 4 Drawing Sheets

METHOD AND APPARATUS FOR COLOR NON-UNIFORMITY CORRECTION IN A DIGITAL CAMERA

FIELD OF THE INVENTION

The invention is related to digital photography, and more particularly related to the correction of digital photographic images for color-dependent vignetting.

BACKGROUND OF THE INVENTION

Non-color-dependent vignetting is a photographic phenomenon in which the picture taken by the camera exhibits a darkening from the center to the corners irrespective of what color is present. Photographs taken by both a film camera and images taken by a digital camera can exhibit vignetting. Some amount of vignetting is acceptable, and actually desirable from an artistic sense. But an excessive amount of vignetting will be objectionable to most people.

In either a film camera or a digital camera, such vignetting is caused by having to capture an image on a small flat surface, namely the film or the optical-to-electronic imager, e.g., a charge coupled device ("CCD"). In either type of camera, rays of light striking the corners of the film/imager travel a longer path and arrive at a different angle of incidence than rays of light which impinge directly upon the center of the film/imager.

Differences in the response of the CCD to light impinging directly versus light impinging at an angle produce non-uniformity in the data corresponding to an image, which is characterized as vignetting. The lens system can also effect vignetting. Plus, if the camera uses a flash device, vignetting can also be due to the flash device's variation in illumination intensity across the subject.

As the name suggests, color-dependent vignetting is to be understood as a vignetting pattern exhibited by a camera in response to a particular color of light. A typical color image sensor in a digital camera includes a mosaic type of image sensor, i.e., a CCD over which is formed a filter array that includes the colors red, green and blue. Each pixel has a corresponding red, green or blue filter area. A typical arrangement of the color filter array is the Bayer pattern that repeats a two-line pattern. The first line contains alternating red and green pixels and the second line contains alternating blue and green pixels. The larger number of green pixels represents an adaptation for the increased sensitivity to green light exhibited by the human eye. The separate color arrays, or planes, of data images formed by the sensor are then combined to create a full-color image after suitable processing.

Color-dependent vignetting can be exhibited in addition to non-color-dependent vignetting. The human eye is very sensitive to color-dependent variation. Hence, color-dependent vignetting is very objectionable, even in small amounts.

Color-dependent vignetting can be minimized by using higher quality lens systems, image sensors and/or flash devices. But this is an impractical solution in a situation in which the minimization of system cost and/or system complexity are important design criteria.

SUMMARY OF THE INVENTION

The invention, in part, provides, e.g., a method (and corresponding apparatus) for correcting color-dependent vignetting in a digital camera. Such a method comprises: providing, for each color that said camera can image, a raw array of data corresponding to an image of a desired scene; and changing the raw arrays such that the array for each color exhibits substantially the same amount of vignetting so as to reduce color-dependent vignetting in a composite image based upon each of the changed arrays.

Such technology according to the invention includes not only provides a method, but also a corresponding apparatus and a computer-readable medium having code portions embodied thereon (that, when executed by a processor, cause the processor to perform the method).

Additional features and advantages of the invention will be more fully apparent from the following detailed description of the preferred embodiments, the appended claims and the accompanying drawings.

BRIEF DESCRIPTION OF THE DRAWINGS

The invention will be explained in more detail below, by way of example with reference to exemplary embodiments as illustrated in the drawings, wherein.

DETAILED DESCRIPTION OF THE EXAMPLE EMBODIMENTS

An embodiment of the invention is, in part, the recognition that it is desirable to remove color-dependent vignetting without, and in some cases, while also, removing non-color dependent vignetting.

An embodiment of the invention is, in part, a recognition that color-dependent vignetting can be reduced or eliminated without resorting to costly lens systems, flash devices and/or imager devices, e.g., charge coupled devices ("CCDs"); provides, in part, technology to correct color-dependent vignetting in a digital camera in real time; and provides, in part, technology that makes it possible for low to moderate cost digital camera architectures to achieve such correction in real time via digital processing.

Figure 1:
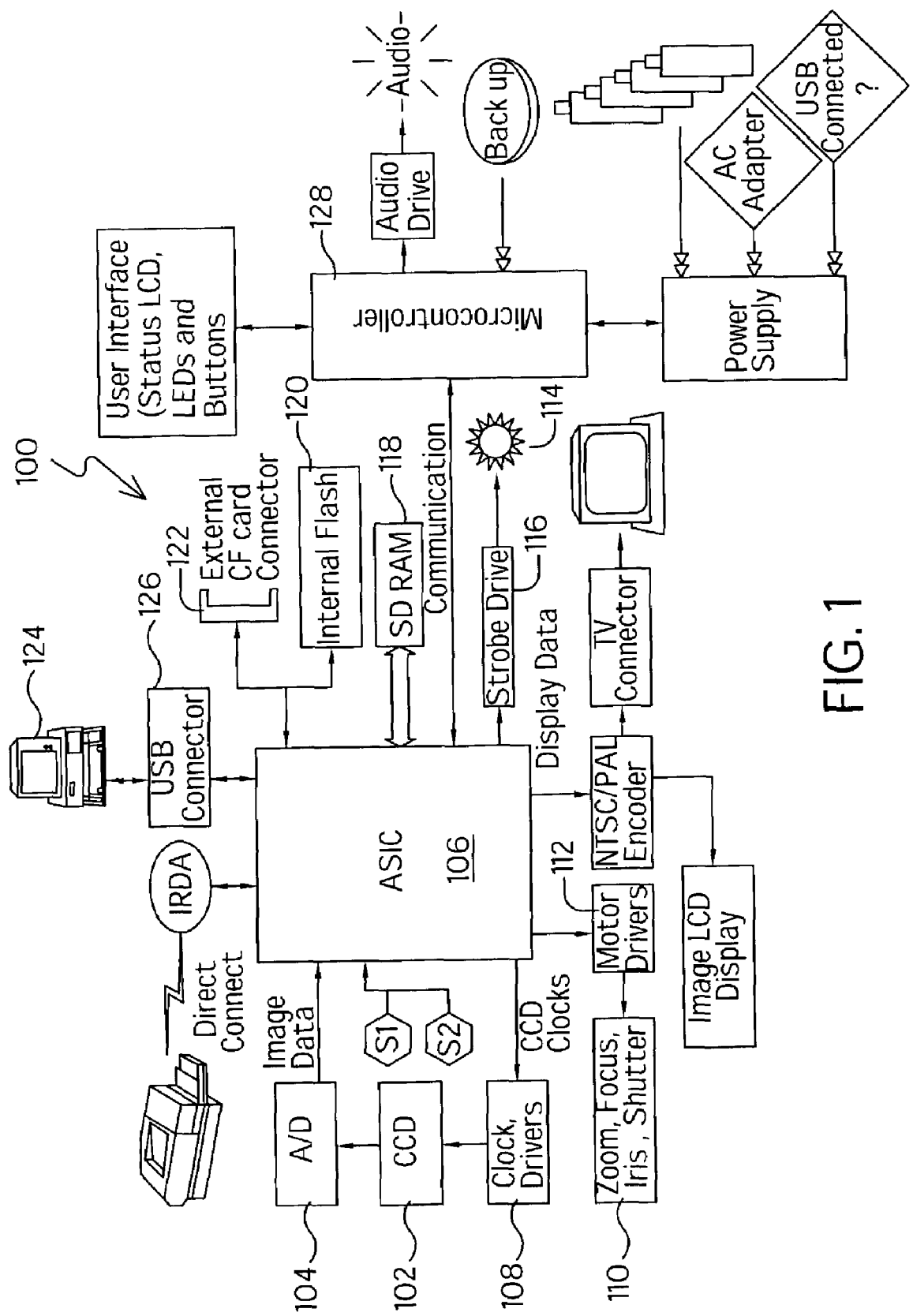
FIG. 1 is a block diagram of hardware architecture of a digital camera according to an embodiment of the invention.

FIG. 1 is a schematic block diagram of hardware architecture of a digital camera according to an embodiment of the invention. The digital camera 100 of FIG. 1 includes a charge-coupled-device ("CCD") 102 that provides an analog signal to an analog-to-digital ("A/D") device 104, the A/D converter 104 providing digitized output of the CCD 102 to an application-specific integrated circuit ("ASIC") 106. The ASIC 106 provides clock signals to clock drivers 108 that are used to operate the CCD 102.

The camera 100 also includes: zoom (optional), focus, iris and shutter mechanisms 110 that are operated via motor drivers 112 by the ASIC 106; and a flash unit 114 operated via a strobe drive 116 controlled by the ASIC 106; As for memory devices, the digital camera 100 includes: a volatile memory, namely a synchronous dynamic random access memory ("SDRAM") device 118; and a non-volatile memory, namely internal flash memory device 120, plus a connector 122 for connection to an external compact flash memory device. The ASIC 106 can also connect to an external work station 124, e.g., through a universal serial bus ("USB") connector 126.

The digital camera 100 also includes a microcontroller 128 with which the ASIC 106 can communicate.

Other architectures for the camera are contemplated. Each such architecture can include one or more processors, one or more volatile memory devices and one or more non-volatile memory devices.

The CCD 102 is assumed to be a mosaic sensor that produces four (4) separate color planes for each image of a scene. Such a mosaic sensor is contemplated as typically exhibiting a Bayer pattern such that any square block of pixels will have two (2) green pixels, one (1) red pixel and one (1) blue pixel.

The combination of the lens system (not depicted), the CCD 102 and the flash device 114 will produce images that exhibit both color-dependent vignetting as well as non-color-dependent vignetting. It is known that stringent design of these components can significantly reduce each phenomenon. But such a system is very expensive and still cannot reduce the phenomena uniformly for multiple combinations of the camera's operational parameters, namely zoom, focus, iris, shutter speed, etc.

As mentioned above, the invention is, in part, a recognition that color-dependent vignetting, as well as non-color-dependent vignetting, can be reduced or substantially eliminated via (according to an embodiment of the invention) digital manipulation of the raw color planes 202 representing an image 200 of a scene using a low-to-moderate cost combination of a CCD 102, a lens system (not depicted) and a flash 114.

Figure 2:
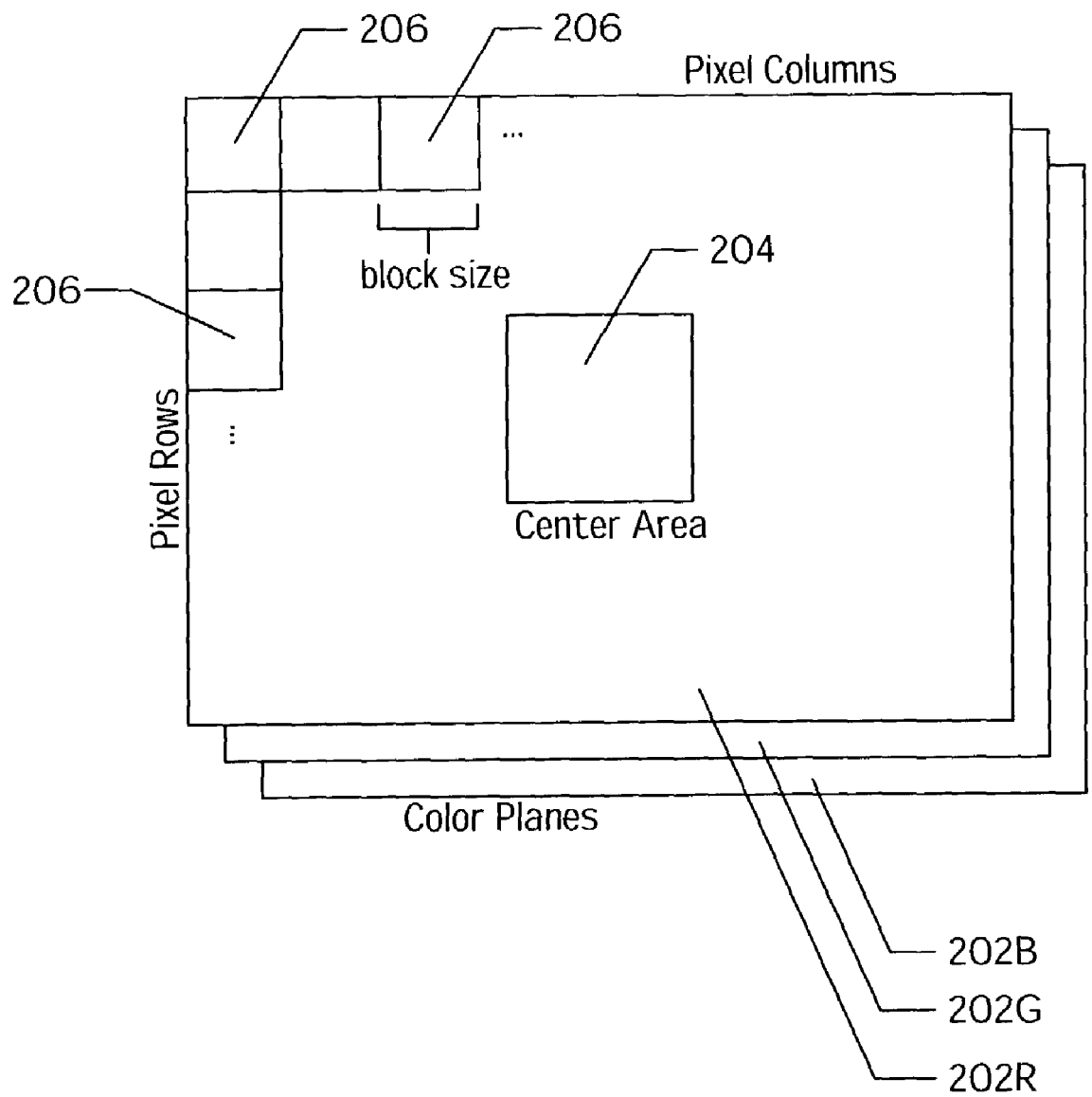
FIG. 2 is a depiction of the screen color arrays or planes corresponding to an image according to an embodiment of the invention.

For each instance in which the digital camera 100 captures an image via the CCD 102, etc., the image 200 is represented by three (3) color planes or arrays 202R, 202G and 202B, as depicted in FIG. 2. It is contemplated that other color systems can be used to represent the image 200, which would result in different color arrays 202. In the situation in which the subject is a white calibration source, then the image 200 represents characteristic planes or arrays that reveal the CCD's 102 fundamental or characteristic sensitivities in terms of color-dependent vignetting.

For each pixel in a characteristic plane, a calibration factor can be calculated that will reduce (or substantially eliminate as the design choice may be) color-dependent vignetting when it is multiplied with a corresponding raw pixel magnitude from a raw color array. Technology for producing such a calibration set of characteristic planes or arrays is disclosed in the commonly-assigned co-pending application, (HDP Ref. No. 62150-000061), filed on the same day as this application and sharing some inventors in common with this application, the entirety of which is incorporated by reference.

The digital camera 100 has many operating parameters, e.g., aperture, zoom, F-stop, shutter speed, etc. The total number of combinations of particular values for the camera's operating parameters can be very large. In an ideal situation in which no disadvantage was associated with an increased size of the flash memory device 120, then a set of characteristic planes could be stored for each combination of operating parameter values. In this scenario, correction of color-dependent vignetting in an image 200 of a scene can include: temporarily storing the raw/uncorrected color planes 202R, 202G and 202B corresponding to an image 200 of the scene in, e.g., the SDRAM memory 118; selecting the set of characteristic planes corresponding the camera's 100 parameters (in effect when the image was captured); correcting each pixel using the corresponding calibration coefficient; and overwriting the raw array 200 in the SDRAM memory 118 or writing the corrected image to the internal flash memory 120 and discarding the corresponding raw image 200 in the SDRAM memory 118.

Rather than storing a set of calibration factors for every possible combination of camera parameters, an embodiment of the present invention fits a polynomial equation to each set of calibration factors and instead stores each set of polynomial coefficients. Then for a given set of camera operating parameters, a set of polynomial equations can be selected that can be used to calculate a set of calibration factors, respectively.

A second-order polynomial equation is:

$$Ax^2+By^2+Dxy+Ex+Fy+G=C$$

where C is the correction value and x,y are pixel coordinates.

The polynomial coefficient sets can be stored in the flash memory 120. Either the ASIC 106 and/or the microcontroller 128 can read the appropriate coefficient set from the flash memory 120, calculate the particular calibration factor, scale the corresponding pixel's raw magnitude using the calibration factor to obtain a corrected pixel magnitude; and then store the corrected value to the flash memory 120.

A polynomial equation can be fitted to each characteristic plane empirically using a least squares analysis, a regression analysis, etc. An example of a well known program that integrates numerical analysis, matrix computation, signal processing and graphics to thereby provide polynomial fitting capability is made available by THE MATHWORKS, INC. under the brand name of MATLAB. The characteristic data can be transferred to the workstation 124, which fits a polynomial to it. Then the coefficients of the polynomial can be stored in the camera's non-volatile memory, e.g., flash memory 120.

The degree of fit between the polynomial and the characteristic plane generally translates to what order of polynomial equation is used, i.e., second order, third order, fourth order etc. The better the fit, the higher the order of the polynomial equation will be. But the higher the order of the polynomial, the greater the computational load presented by each calibration factor's calculation.

The size of the polynomial coefficient sets and the number of sets stored represents a compromise between how much internal flash memory 120 is consumed versus how much processing will be needed to produce a calibration factor at the time of correction. Using lower-order (e.g., second order) polynomials reduces the number of calculations needed during correction, so correction can be accomplished more quickly. But the calibration factors generated by the lower-order polynomial do not match up to the original calibration set as well as those generated by a higher-order polynomial, i.e., produces lower quality corrections.

On the other hand, using higher-order polynomials produces higher quality corrections but also increases the number of calculations needed during correction. If the speed of the interpolating processor, e.g., ASIC 106 or microcontroller 128, is not correspondingly improved (with an associated increase in camera cost), then the speed of the correction will correspondingly decrease as the order of the polynomial increases. The appropriate balance between the exactness of fit, i.e., the size of the polynomial coefficient set, and the processor speed depends upon the particular architecture of the camera as well as the target price point and performance for the camera in its relevant market.

As a practical matter, given the cost versus capability of commercially available memory devices that are available currently, storing every possible polynomial coefficient set would require an internal flash memory device 120 that is large and/or expensive. So as a further practical consideration (given currently available memory technology), it may be desirable to avoid storing a polynomial coefficient set for every possible combination of the camera's operational parameters. But it is expected that cost versus capability will continue to improve such that, at some point in the future, a calibration set can be stored for every possible combination of the camera's operational parameters as a practical matter.

An embodiment of the invention stores a relatively small number of polynomial coefficient sets (in comparison to every possible polynomial coefficient set) along with a mapping that can be used to select an appropriate polynomial coefficient set. The mapping selects the appropriate polynomial coefficient set based upon a given set of values to which the camera's operational parameters were adjusted when the image 200 was captured.

As discussed in the copending application, an example implementation of the invention assumes a mosaic-CCD camera that stores six (6) sets of polynomial coefficient sets. These correspond to three (3) zoom settings, (wide, medium, telephoto) and two (2) of the camera's three (3) aperture settings (½, 1.0). A simple look-up table (LUT) can be used to select the appropriate calibration set for the particular values to which the camera's operating parameters have been adjusted.

Figure 3:
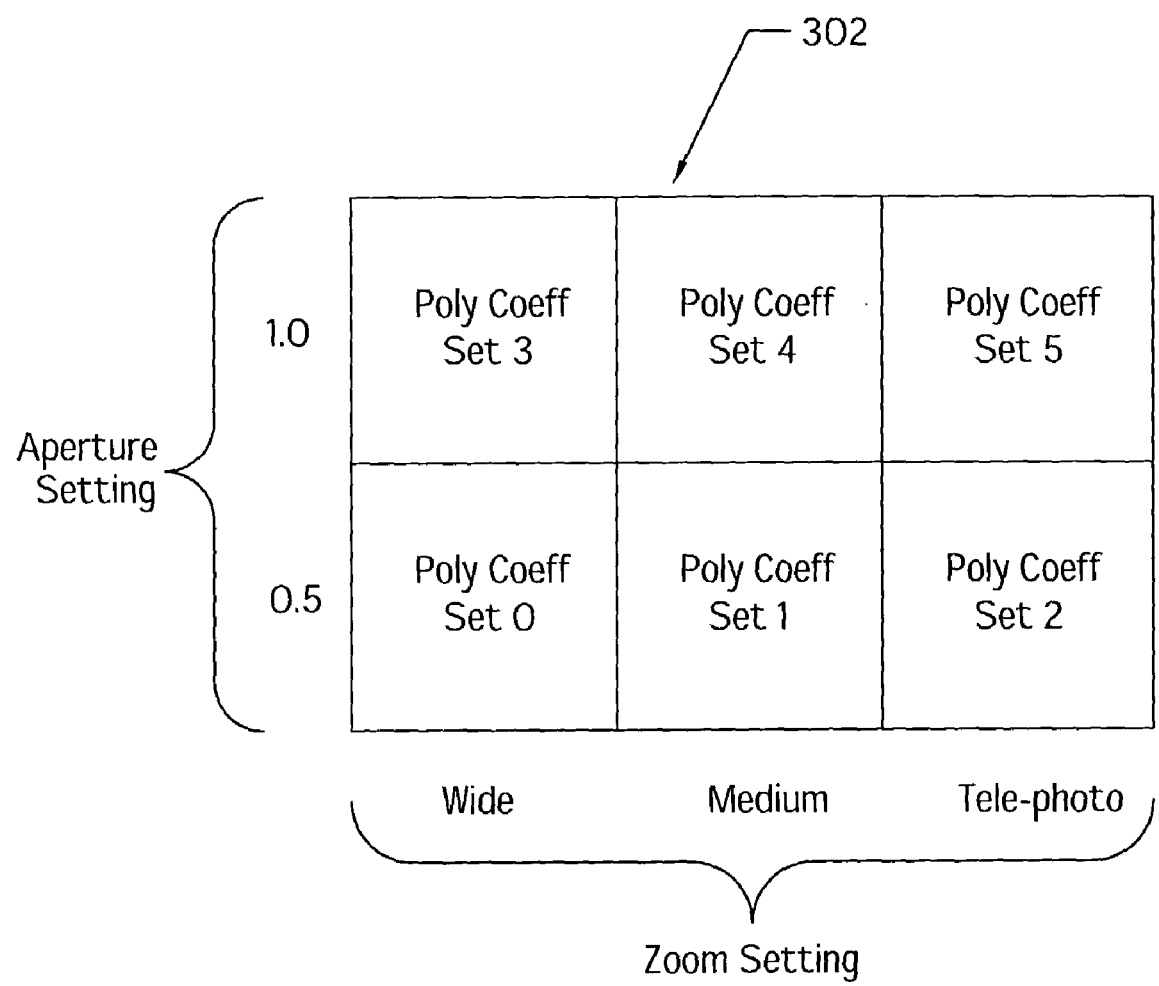
FIG. 3 is a pictorial representation of mapping used to select a polynomial coefficient set according to an embodiment of the invention.

An example of such an LUT 302, which can be stored in the flash memory device 120, is depicted in FIG. 3. There, the rows correspond to the two (2) aperture settings, while the columns correspond to the three (3) zoom settings. If a raw image 100 is captured using an aperture of 1.0 and a zoom setting of telephoto, the polynomial coefficient set No. 5 will be selected to correct the raw array 200. The LUT 302 treats or maps the other parameters of the camera as don't-care conditions, i.e., the values to which these other parameters are adjusted has no effect upon the selection of the appropriate polynomial coefficient set. It is contemplated that other sets of calibration data and/or other mappings can be used.

Once an appropriate calibration set has been selected via the LUT 302, then the pixels in the raw array 200 must be corrected. An embodiment of the invention corrects each pixel in the raw array. Fewer than every pixel can be corrected, but image quality will decrease as fewer of the pixels are corrected.

The raw pixel magnitudes are scaled, i.e., corrected, using the calibration factors generated by the corresponding polynomial equations. The equations for such scaling are:

$R_{corr}(x,y) = C_R(x,y) * R_{raw}(x,y)$ $B_{corr}(x,y) = C_B(x,y) * B_{raw}(x,y)$ $G_{corr}(x,y) = C_G(x,y) * G_{raw}(x,y)$ where $C_R$, $C_B$ and $C_G$ are the red, blue and green calibration factors, respectively. It must be remembered that the correction factor, $C_G$, for a raw green data array is equal to one in a green-normalization scenario, i.e., $C_G=1$, so $G_{corr}=G_{raw}$.

Figure 4:
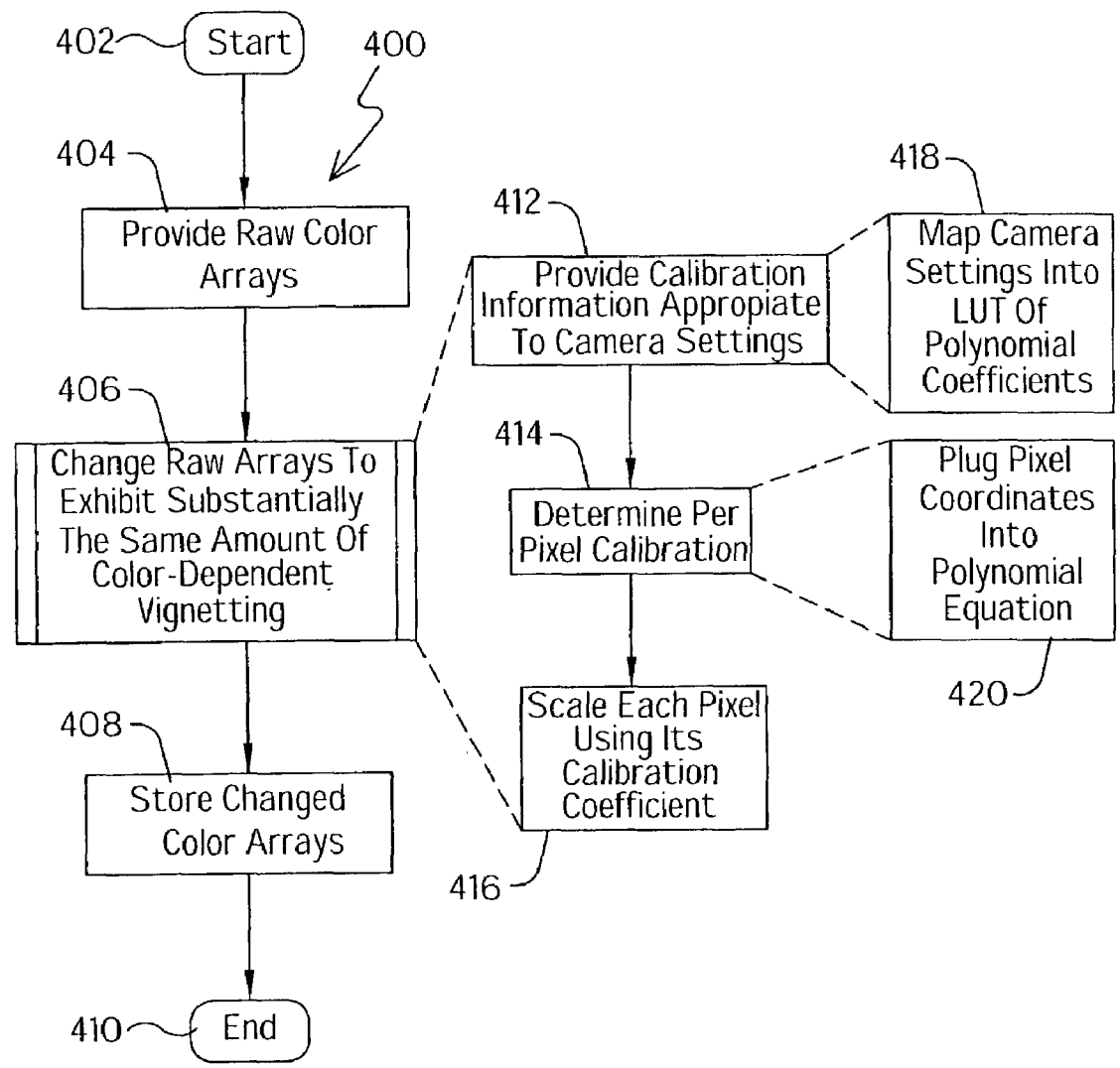
FIG. 4 is a flow chart of operations according to an embodiment of the invention.

FIG. 4 is a flow chart 400 depicting operations according to an embodiment of the invention. Flow starts at block 402 and proceeds to block 404, where raw color arrays are provided, e.g., via the CCD 102, etc., resulting in the three (3) color planes or arrays 202R, 202G and 202B (again as depicted in FIG. 2). At the next block 406, the raw arrays are changed so as to exhibit substantially the same amount of color-dependent vignetting. At the next block 408, the changed color arrays are stored. Flow proceeds then to block 410, where flow ends.

Block 406 can be implemented, e.g., via blocks 412-416. At block 412, calibration information appropriate to the settings of the camera 100 is provided, e.g., by way of polynomial equations that model each color's calibration factors. At the next block 414, each pixel's calibration factor is determined, e.g., by plugging the coordinates of the pixel into the appropriate polynomial equation. At the next block 416, each pixel is scaled, e.g., changed, using its calibration coefficient.

Block 412 can be implemented, e.g., with block 414 in which the camera settings are mapped via a look-up table (LUT) of polynomial coefficients. Block 414 can be embodied, e.g., by block 420 in which the coordinates of each pixel are plugged into the polynomial equation from a respective color.

Except for dark frame subtraction, it is anticipated that the color-dependence correction should take place preferably before any other data manipulation such as demosaicing, color correction, preferred tone, etc. Dark frame subtraction should occur before the color-dependence correction otherwise it is necessary to correct two images). While it is not strictly necessary to correct the color-dependence first, it has been found that doing so (before all but the dark frame subtraction) simplifies and/or improves the other calculations. Alternatively, the raw images could be kept temporarily in the flash memory 120. Then, later, the camera 100 could be connected to the external work station 124 which could perform the color-correction calculation and either store the corrected image back in the internal flash memory 120 or store them itself. Advantages exhibited by the invention include the following:

Embodiments of the invention relax requirements upon the lens, the CCD, the flash device and (optionally) other optical filters in a digital camera that would otherwise be more stringent if color-dependent vignetting were not removed by digital processing. This can make these components less complex, lower in cost and/or smaller in size than similar components for a camera that does not utilize this invention.

Embodiments of the invention can provide improved image quality for photographs taken with a digital camera utilizing the invention because vignetting and color-dependent vignetting can be reduced by an amount up to and including zero (0). Such high performance is not possible using the Background Art's solution of placing stringent requirements on the lenses, CCD flash unit, etc., in order to remove color-dependent vignetting.

Embodiments of the invention makes it possible to design any amount of vignetting, non-color dependent, or color-dependent, into the camera systems through the use of digital image processing. Design of a certain amount of non-color-dependent vignetting into the camera system can be used to achieve a certain amount of artistic content in a image. In the Background Art, where vignetting was controlled by the physical attributes of the lens, CCD flash unit, etc., the same amount of vignetting is applied to all photographs. This is much less flexible, in affect, allowing for no variation in the amount of vignetting according to artistic reference.

It is very difficult, if not impossible, to eliminate or set the vignetting to be the same for different apertures (F-numbers) and zoom position in a camera system that deals with vignetting only by way of the physical attributes of the lens, CCD flash unit, etc., as in the Background Art. Therefore, a camera that does not use embodiments according to the invention will produce different amounts of vignetting for photographs taken with different settings for the operational parameters of the camera. Embodiments of the present invention allow a digital camera to produce an image with substantially the same vignetting for all zoom positions and apertures in camera.

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed:

1. A method of correcting color-dependent vignetting in a digital camera, the method comprising:
   providing, for each color that said camera can image, a raw array of data corresponding to an image of a desired scene;
   providing a plurality of candidate first sets of polynomial coefficients,
      each first set representing calibration polynomials that describe second sets of color-specific arrays of calibration coefficients, respectively, the calibration coefficients being appropriate to at least one combination of parameter values to which the camera could have been set when the respective raw arrays were captured;
   determining values of operating parameters to which parameters of the camera were adjusted when the respective raw arrays were captured;
   selecting a first set from among the plurality of candidates based upon the determined values; and
   changing the raw arrays according to the selected first set such that the array for each color exhibits substantially the same amount of vignetting so as to reduce color-dependent vignetting in a composite image based upon each of the changed arrays.

2. The method of claim 1, wherein said changing produces changed arrays, the method further comprising:
   storing each changed array as the respective data array corresponding to said desired image.

3. The method of claim 2, wherein said storing overwrites locations of said raw arrays in memory with corresponding values of the changed arrays, respectively.

4. The method of claim 1, wherein said changing is performed entirely by processing circuitry within said camera or entirely by a processor external to said camera.

5. The method of claim 1, wherein said providing provides a red array, a green array and a blue array for each desired scene.

6. The method of claim 1, wherein said providing includes: capturing, via said camera, said raw array of data for each color.

7. The method of claim 1, wherein:
   the first sets correspond to a plurality of combinations of values for camera operating parameters, respectively.

8. The method of claim 7, wherein:
   for the raw array corresponding to each color, said changing includes processing each raw array of color data using the corresponding calibration polynomial so as, for each pixel, to do at least the following,
      determine a calibration coefficient for the pixel based upon the corresponding calibration polynomial equation, and
      scale the pixel by the corresponding calibration coefficient.

9. The method of claim 8, wherein:
   a total number of possible combinations of parameter values to which said camera parameters could be set is greater than the number of said first sets; and
   the step of selecting a first set includes at least the following,
      selecting from among the first sets based upon a predetermined mapping between the total number of parameter-value combinations and said first sets.

10. The method of claim 9,
    wherein said mapping maps from said total number of parameter-value combinations to said first sets are based upon zoom setting and aperture, said mapping treating other ones of said parameters as don't-care conditions.

11. The method of claim 10,
    wherein said zoom setting can include the values wide, medium and telephoto, and said aperture can include the values A and B; and
    wherein said first sets include sets corresponding to the following pairings of zoom setting and aperture: wide zoom and aperture A; medium zoom and aperture A; telephoto zoom and aperture A; wide zoom and aperture B; medium zoom and aperture B; and telephoto zoom and aperture B.

12. The method of claim 10, wherein said mapping is look-up table mapping.

13. A system of correcting color-dependent vignetting in a digital camera, the system comprising:
    an imager to provide for each color that said camera can image, a raw array of data corresponding to an image of a desired scene;
    a memory to store a plurality of candidate first sets of polynomial coefficients,
       each first set representing calibration polynomials that describe second sets of color-specific arrays of calibration coefficients, respectively, the calibration coefficients being appropriate to at least one combination of parameter values to which the camera could have been set when the respective raw arrays were captured; and
    processing circuitry to do at least the following,
       determine values of operating parameters to which parameters of the camera were adjusted when the respective raw arrays were captured,
       select a first set from among the plurality of candidates based upon the determined values, and
       change the raw arrays according to the selected first set such that the array for each color exhibits substantially the same amount of vignetting so as to reduce color-dependent vignetting in a composite image based upon each of the changed arrays.

14. The system of claim 13, wherein said processing circuitry also is operable at least to produce changed arrays, the system further comprising:
    at least one memory to store the changed arrays as the respective data arrays corresponding to said desired image.

15. The system of claim 13, wherein said processing circuitry also is operable at least to overwrite locations of said raw arrays in memory with corresponding values of the changed arrays, respectively.

16. The system of claim 13, wherein said processing circuitry is one of processing circuitry within said camera or processing circuitry external to said camera.

17. The system of claim 13, wherein said imager is operable to image a red array, a green array and a blue array for each desired scene.

18. The system of claim 13, wherein said imager is operable to capture, via said camera, said raw array of data for each color.

19. The system of claim 13, wherein:
the first sets correspond to a plurality of combinations of values for camera operating parameters, respectively.

20. The system of claim 19, wherein:
for the raw array corresponding to each color, said processing circuitry is operable to process each raw array of color data using the corresponding calibration polynomial so as, for each pixel, to do at least the following:
determine a calibration coefficient for the pixel based upon the corresponding calibration polynomial equation; and
scale the pixel by the corresponding calibration coefficient.

21. The system of claim 20, wherein:
a total number of possible combinations of parameter values to which said camera parameters could be set is greater than the number of said first plurality of coefficient sets; and
said processing circuitry also is operable at least to select from among the first sets based upon a predetermined mapping between the total number of parameter-value combinations and said first sets.

22. The system of claim 21, further comprising a look-up table wherein said mapping is stored.

23. The system of claim 21,
wherein said mapping is from said total number of parameter-value combinations to said first sets based upon zoom setting and aperture.

24. The system of claim 23,
wherein said zoom setting can include the values wide, medium and telephoto, and said aperture can include the values A and B; and
wherein said first sets includes sets corresponding to the following pairings of zoom setting and aperture: wide zoom and aperture A; medium zoom and aperture A; telephoto zoom and aperture A; wide zoom and aperture B; medium zoom and aperture B; and telephoto zoom and aperture B.

25. A system of correcting color-dependent vignetting in a digital camera, the system comprising:
imaging means for providing, for each color that said camera can image, a raw array of data corresponding to an image of a desired scene;
a memory to store a plurality of candidate first sets of polynomial coefficients,
each first set representing calibration polynomials that describe second sets of color-specific arrays of calibration coefficients, respectively, the calibration coefficients being appropriate to at least one combination of parameter values to which the camera could have been set when the respective raw arrays were captured;
means for determining values of operating parameters to which parameters of the camera were adjusted when the respective raw arrays were captured;
means for selecting a first set from among the plurality of candidates based upon the determined values; and
means for changing the raw arrays according to the selected first set such that the array for each color exhibits substantially the same amount of vignetting so as to reduce color-dependent vignetting in a composite image based upon each of the changed arrays.

26. The system of claim 25, wherein:
the first sets correspond to a plurality of combinations of values for camera operating parameters, respectively.

27. A computer-readable medium having code portions embodied thereon that, when read by a processor, cause said processor to perform the method of claim 1.

28. A method of correcting color-dependent vignetting in a digital camera, the method comprising:
providing, for each color that said camera can image, a raw array of data corresponding to an image of a desired scene; and
changing the raw arrays such that the array for each color exhibits substantially the same amount of vignetting so as to reduce color-dependent vignetting in a composite image based upon each of the changed arrays;
wherein the step of changing includes reducing an amount of color-dependent vignetting without necessarily having to reduce an amount of non-color-dependent vignetting.

29. A system of correcting color-dependent vignetting in a digital camera, the system comprising:
an imager to provide for each color that said camera can image, a raw array of data corresponding to an image of a desired scene; and
processing circuitry to change the raw arrays such that the array for each color exhibits substantially the same amount of vignetting so as to reduce color-dependent vignetting in a composite image based upon each of the changed arrays;
wherein the processing circuitry is operable to change the raw arrays by being further operable to reduce an amount of color-dependent vignetting without necessarily having to reduce an amount of non-color-dependent vignetting.

30. A system of correcting color-dependent vignetting in a digital camera, the system comprising:
imaging means for providing, for each color that said camera can image, a raw array of data corresponding to an image of a desired scene; and
camera means for changing the raw arrays such that the array for each color exhibits substantially the same amount of vignetting so as to reduce color-dependent vignetting in a composite image based upon each of the changed arrays;
wherein the camera means for changing the raw arrays is further for reducing an amount of color-dependent vignetting without necessarily having to reduce an amount of non-color-dependent vignetting.

* * * * *